United States Patent
Lopez-Apodaca

(10) Patent No.: US 8,479,960 B2
(45) Date of Patent: Jul. 9, 2013

(54) PORTABLE TELEPHONE HOLDER FOR SUN VISOR

(76) Inventor: Ruben Lopez-Apodaca, Anaheim, CA (US)

( * ) Notice: Subject to any disclaimer, the term of this patent is extended or adjusted under 35 U.S.C. 154(b) by 0 days.

(21) Appl. No.: 13/068,138

(22) Filed: May 3, 2011

(65) Prior Publication Data

US 2012/0280014 A1 Nov. 8, 2012

(51) Int. Cl.
*B60R 7/05* (2006.01)

(52) U.S. Cl.
USPC ........... 224/312; 224/669; 224/679; 224/681; 224/930

(58) Field of Classification Search
USPC ................. 224/483, 485, 269, 567, 570, 581, 224/582, 669, 679, 681, 245, 312, 552, 560, 224/930; 455/575.1, 575.4, 575.9, 575.6; 206/193, 194; D3/218; 220/529, 530
See application file for complete search history.

(56) References Cited

U.S. PATENT DOCUMENTS

| | | | | |
|---|---|---|---|---|
| 3,668,802 A | * | 6/1972 | Benward | 43/57.1 |
| 4,326,653 A | * | 4/1982 | Stone | 224/312 |
| 4,858,798 A | * | 8/1989 | Siddoway et al. | 224/242 |
| 4,887,753 A | * | 12/1989 | Allen | 224/312 |
| 4,948,022 A | * | 8/1990 | VanDyke | 224/483 |
| 5,261,583 A | * | 11/1993 | Long et al. | 224/245 |
| D351,280 S | * | 10/1994 | Pennington et al. | D3/218 |
| 5,388,741 A | * | 2/1995 | Hillinger | 224/679 |
| 5,490,213 A | | 2/1996 | Huang | |
| 5,711,469 A | | 1/1998 | Gormley | |
| D395,545 S | * | 6/1998 | Crim, Jr. | D3/218 |
| 5,785,222 A | * | 7/1998 | Basso et al. | 224/555 |
| 5,961,016 A | * | 10/1999 | Hartmann et al. | 224/571 |
| 6,275,683 B1 | * | 8/2001 | Smith | 455/575.1 |
| 6,367,672 B1 | * | 4/2002 | Lind | 224/245 |
| 6,405,910 B1 | | 6/2002 | Infanti | |
| 6,491,194 B2 | * | 12/2002 | Marvin | 224/483 |
| 6,502,727 B1 | | 1/2003 | Decoteau | |
| 6,728,556 B1 | | 4/2004 | Whitley | |
| 6,955,280 B2 | | 10/2005 | Saitoh | |
| 7,233,661 B2 | | 6/2007 | Palett | |
| 7,236,355 B2 | | 6/2007 | Kim | |
| D554,569 S | | 11/2007 | Kolenda | |
| D581,155 S | * | 11/2008 | Richardson et al. | D3/218 |
| 2002/0190176 A1 | | 12/2002 | Louh | |
| 2005/0072822 A1 | * | 4/2005 | Stotts | 224/269 |
| 2008/0316687 A1 | * | 12/2008 | Richardson et al. | 361/680 |
| 2009/0159471 A1 | | 6/2009 | Koppe | |
| 2011/0000945 A1 | | 1/2011 | Mongan | |

FOREIGN PATENT DOCUMENTS

JP 2005088658 4/2005

* cited by examiner

*Primary Examiner* — Justin Larson
*Assistant Examiner* — Corey Skurdal
(74) *Attorney, Agent, or Firm* — Dennis W. Beech

(57) ABSTRACT

The present invention may be used for positioning portable telephones on sun visors in vehicles. The holder may be in the general form of a rectangular box structure with a back side wall with a hanger attached, a right and a left side wall attached to the back side wall, a front side wall attached to the two side walls, and a bottom wall to form an open top interior chamber. The front side wall may have at least one opening therein.

9 Claims, 2 Drawing Sheets

PORTABLE TELEPHONE HOLDER FOR SUN VISOR

BACKGROUND OF THE INVENTION

This invention relates to devices for use to position portable telephones on sun visors in vehicles. The new holder allows positioning a portable telephone in a vehicle to facilitate voice communication for using the telephone while operating the vehicle.

Various electronic device holders, pouches, brackets and the like may be known for mounting portable telephones and radios in a vehicle on dashboards, rearview mirrors and sun visors. The holders or pouches may be held on a visor by hook and loop straps or other strap structures, held on a mirror or dashboard by fasteners or hook and loop with adhesive backing. Generally these devices may not enclose a portable telephone in a rigid enclosure with open access to the display, keyboard, and other switch devices of the telephone, for example, a cellular telephone. More typically existing pouch or holder devices are constructed of soft material that generally encloses a cellular phone. The material may be sound porous to allow voice transmission and may have a plastic transparent cover for visual viewing or switch pushing. Visibility may not be good with such devices. More rigid structures may be in the form of open bracket with clip or hook structures to hold a cellular phone at its corners or sides, but not to substantially enclose the cellular telephone.

SUMMARY OF THE INVENTION

The present invention is directed to devices for positioning portable telephones on sun visors in vehicles. The holder may be in the general form of a rectangular box structure with a back side wall with a hanger attached, a right and a left side wall attached to the back side wall, a front side wall attached to the two side walls, and a bottom wall to form an open top interior chamber. The front side wall may have at least one opening therein.

These and other features, aspects and advantages of the present invention will become better understood with reference to the following drawings, description and claims.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
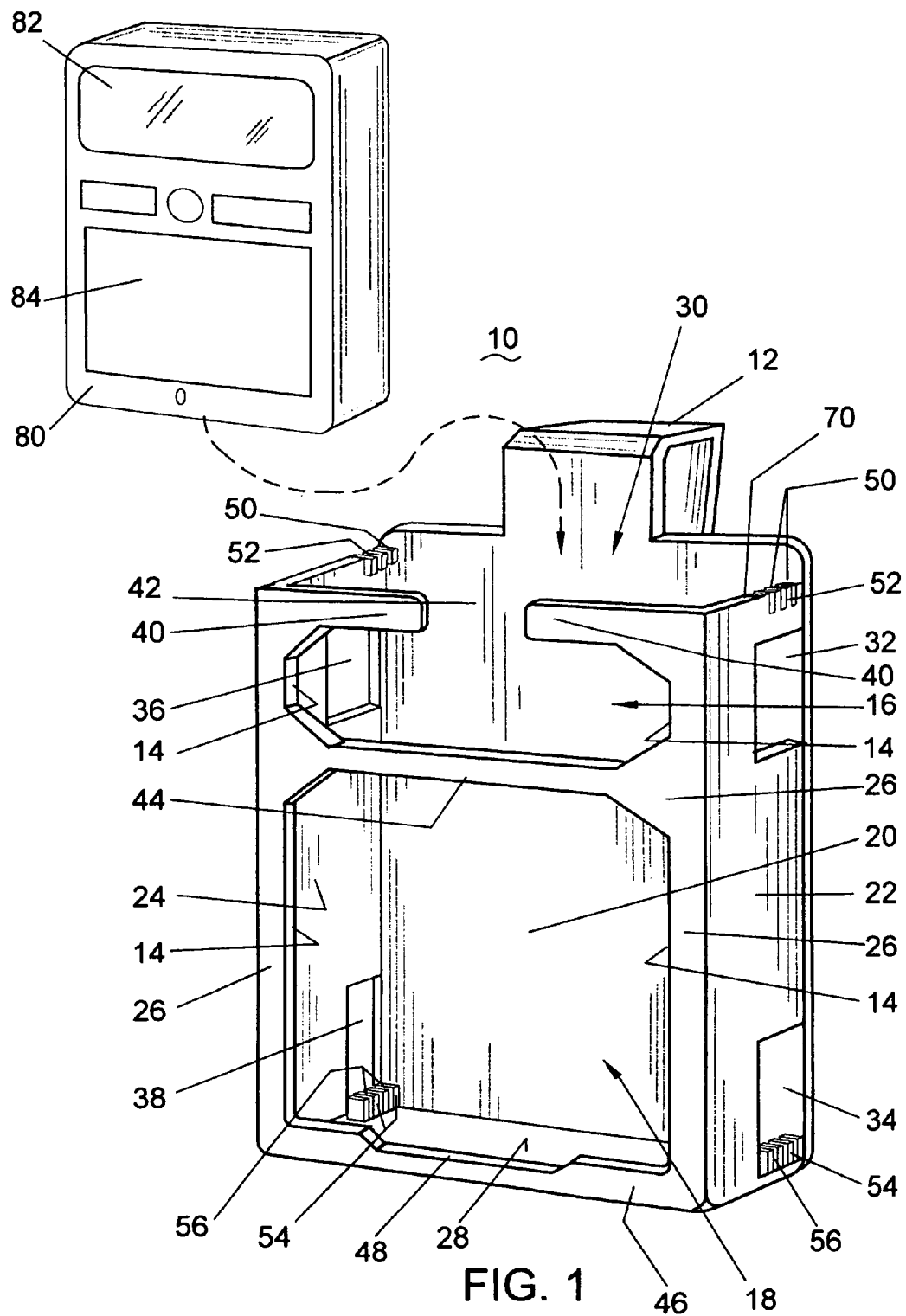
FIG. 1 illustrates a perspective view of a holder according to an embodiment of the invention.
Figure 2:
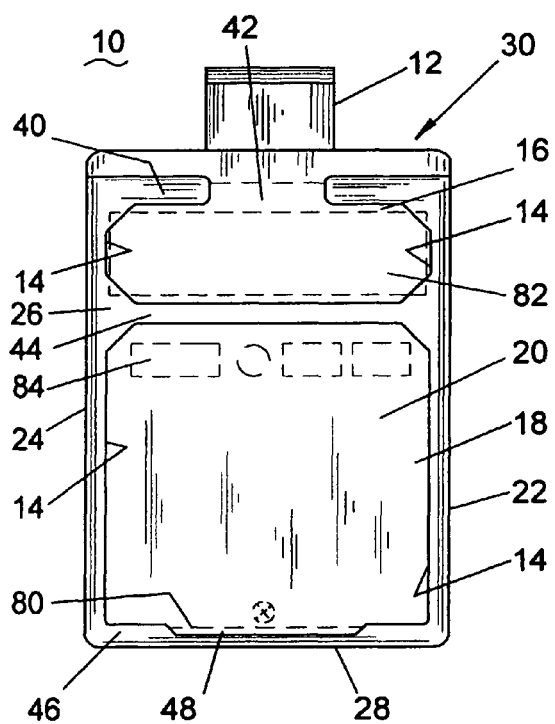
FIG. 2 illustrates a front elevation view of a holder according to an embodiment of the invention.
Figure 4:
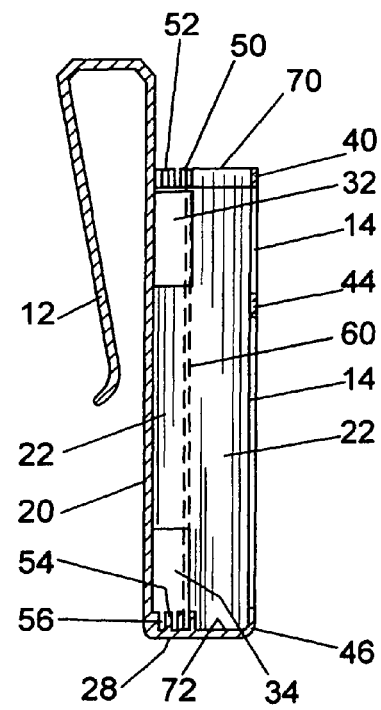
FIG. 4 illustrates a side elevation cross sectional view viewed from the left side of a holder according to an embodiment of the invention.
Figure 3:
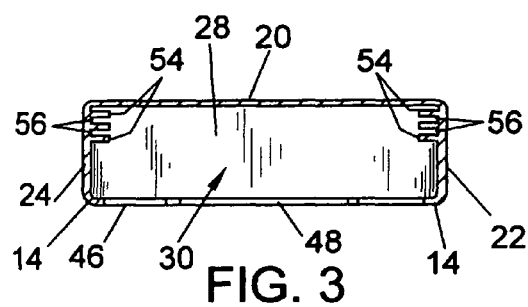
FIG. 3 illustrates a top view of a holder according to an embodiment of the invention.
Figure 5:
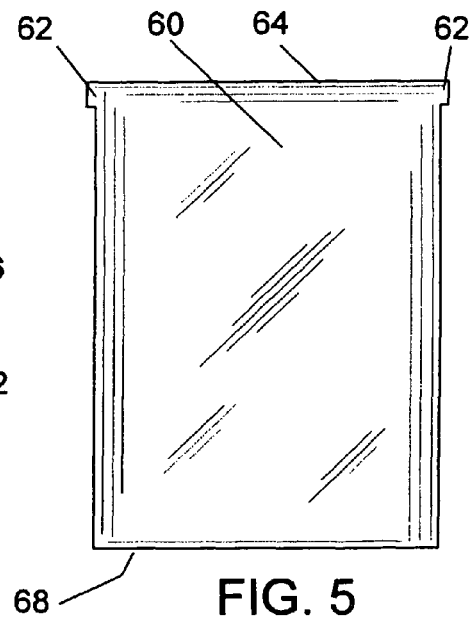
FIG. 5 illustrates a front elevation view of a space adjustment member according to an embodiment of the invention.

Referring to FIGS. 1 through 5, a portable telephone holder 10 for a sun visor may be generally in the form of a rectangular box with a back side wall 20, right side wall 22, a left side wall 24, a front side wall 26, a bottom wall 28 and an open top 30. The front side wall 26 may have access openings 16, 18 defined by border flanges 14, a first retaining member 40, a second retaining member 44 and a bottom retaining member 46. The access openings 16, 18 may be sized to allow viewing of portable telephone displays and the use of keyboards and switches on the front face of a portable telephone. The retaining members 40, 44, 46 may have openings 42 and notches 48 as best illustrated in FIGS. 1 and 2 to allow access to controls on a portable telephone.

The side walls 22, 24 may have a right side top opening 32, a right side lower opening 34, a left side top opening 36, and a left side lower opening 38. The side openings 32, 34, 36, 38 may be located to allow access to controls located on the sides of a portable telephone.

There may be a space adjustment member 60 or removable insertable panel that may be positioned interior to the holder 10 to define the size of the interior chamber 66 to allow a firm fit for an inserted portable telephone. The left and right side walls 22, 24 may have one or more slots 52 formed at the top end 70, separated by tabs 50, and lower slots 56 formed by lower tabs 54 attached to the right and left side walls 22, 24 bottom end 72 and to the bottom wall 28. The space adjustment member 60 may have tab members 62 at a top end 64 such that when the space adjustment member 60 is inserted in the interior chamber 66 the tab members 62 engage the slots 52 and the lower edge 68 of the member 60 engages the lower slots 56 to position the member 60.

There may be a spring clip 12 or hanger attached to the back side wall 20 for use in engaging a sun visor of a vehicle. In use, a portable telephone, for example, a cellular telephone 80 may be inserted into the interior chamber 66 of the holder 10 with a display 82 and keypad 84 positioned for viewing and access through openings 16, 18. The speaker and microphone of the cellular telephone 80 may also be exposed through the openings 16, 18. When a telephone call is to be received or sent, a user may quickly activate the cellular telephone by touching a key or touch display and then may use voice commands. This may be facilitated by attachment of the holder 10 on a vehicle sun visor. The holder 10 may be formed from a plastic material or other suitable general rigid material.

While the invention has been particularly shown and described with respect to the illustrated embodiments thereof, it will be understood by those skilled in the art that the foregoing and other changes in form and details may be made therein without departing from the spirit and scope of the invention.

I claim:

1. A device for positioning a portable telephone on a sun visor of a vehicle comprising:
    a back side wall with a hanger attached;
    a right side wall and a left side wall attached to said back side wall;
    a front side wall attached to said right side wall and said left side wall toから a rectangular box structure with a bottom wall closure and an open top to form an interior chamber wherein said front side wall has a first retaining member and a bottom retaining member with a second retaining member disposed between said first retaining member and said bottom retaining member to define an upper access opening and a lower access opening therein wherein said right side wall and said left side wall have a border flange to further define said upper access opening and said lower access opening;

said left side wall and said right side wall each have at least one upper slot formed with a tab and positioned opposed at a top end;

at least one lower slot formed with a tab attached to each of said left side wall and said right side wall at a bottom end and attached to said bottom side wall wherein said lower slots are positioned opposed;

a space adjustment member that is generally rectangular and flat has a tab member attached at each corner of a top end; and said space adjustment member sized for insertion in said interior chamber for engagement by a lower edge in said lower opposed slots and by each of said tab members in said upper opposed slots.

2. The device as in claim 1 wherein said first retaining member having an opening therein.

3. The device as in claim 1 wherein said bottom retaining member has a notch therein.

4. The device as in claim 1 wherein said right side wall and left side wall each having an opening therein.

5. The device as in claim 1 wherein said right side wall has an upper opening and a lower opening therein.

6. The device as in claim 1 wherein said left side wall has an upper opening and a lower opening therein.

7. The device as in claim 1 wherein said back side wall, said right side wall, said left side wall, said front side wall, and said bottom wall are formed of a generally rigid material.

8. The device as in claim 7 wherein said generally rigid material is a plastic material.

9. The device as in claim 1 wherein said hanger is a spring clip.

\* \* \* \* \*